No. 714,611. Patented Nov. 25, 1902.
A. RIEBE.
COLLAR FOR SHAFT BEARINGS OR THE LIKE.
(Application filed Mar. 19, 1902.)
(No Model.)
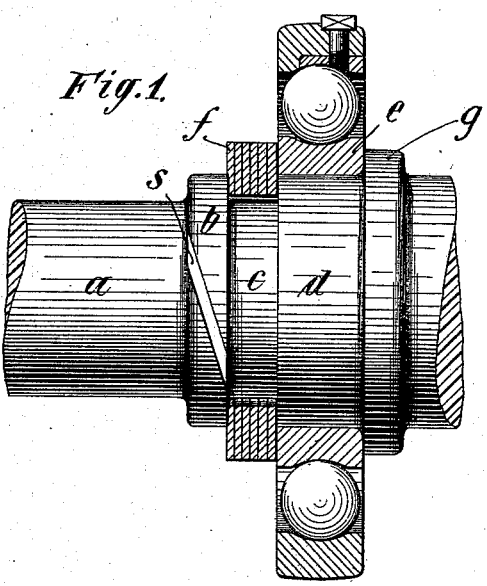
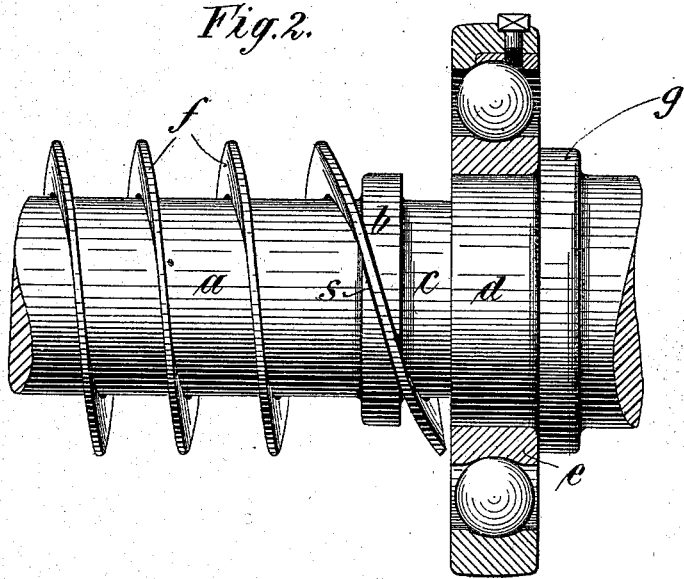

UNITED STATES PATENT OFFICE.

AUGUST RIEBE, OF BERLIN, GERMANY, ASSIGNOR TO THE FIRM OF DEUTSCHE WAFFEN- & MUNITIONSFABRIKEN, OF BERLIN, GERMANY.

COLLAR FOR SHAFT-BEARINGS OR THE LIKE.

SPECIFICATION forming part of Letters Patent No. 714,611, dated November 25, 1902.

Application filed March 19, 1902. Serial No. 98,980. (No model.)

*To all whom it may concern:*

Be it known that I, AUGUST RIEBE, engineer, a subject of the Emperor of Germany, residing at Waldenserstrasse, Berlin, in the Empire of Germany, have invented certain new and useful Improvements in or Connected with Collars for Shaft-Bearings or the Like, of which the following is a specification, reference being had to the drawings hereunto annexed, and to the letters marked thereon.

The invention relates to a check-ring or stop-collar for the bearings of shafts, axles, spindles, or the like, in which the body of the collar or ring is formed by the more or less closely-packed coils of a helical spring. This mode of construction renders it possible to insert at any desired part upon a shaft, spindle, or axle a stop-collar surpassing the ordinary stop-collars in durability and capable of yielding resisting shocks. The introduction of the helical spring into the annular recess forming its seat is effected by passing the spring through an oblique slot or groove formed in the fixed collar, which constitutes one side of the annular recess which serves as the seat of the spring-collar.

In the accompanying drawings, Figure 1 represents a side elevation of part of a shaft or spindle on which a helical-spring collar constructed according to the present invention is shown in section, holding in place upon the shaft or spindle a ball-bearing, which is likewise shown in section; and Fig. 2 illustrates the mode of introducing the helical spring into its seat.

In both figures of the drawings like parts are indicated by similar letters of reference.

The shaft $a$ is provided contiguous to the point where the spring-collar is to be inserted with a shoulder or fixed collar $b$, forming one side of an annular recess $c$, while the opposite side is formed, according to the method of construction shown in the drawings, by the collar $d$, which carries a ball-bearing $e$, provided with inner and outer ball races or bushes and which abuts against the fixed flange or shoulder $g$. The helical collar in this instance is intended to serve the purpose of keeping the ball-bearing $e$ in position. A helical spring $f$, made of flat steel, is used for forming the helical-spring collar, which is introduced into its seat by passing it, in the manner shown in Fig. 2, through an oblique slot or groove $s$ in the fixed collar or shoulder $b$, arranged so as to correspond in shape and pitch to a portion of the helical spring, and the spring is forced by a kind of screwing motion into the annular recess $c$ until all its coils are compressed into said annular recess, thus forming the compact resilient spring-collar shown in Fig. 1.

It is expedient to smooth or polish in a suitable manner the end or side faces of the helical spring, after having adjusted it to a proper length, before introducing it into the recess, so that they may offer a minimum of frictional resistance during said fitting operation.

The outer periphery of the helical spring may be roughened or notched for the purpose of facilitating the application of a tool in order to force the spring through the slot $s$. After the end of the coil has been brought into the recess $c$ the spring-collar thus formed may slide within the recess without any possibility of its becoming dislodged from its position.

Having now particularly described and ascertained the nature of the said invention and in what manner the same is to be performed, I declare that what I claim is—

1. In a device of the character described, the combination with a shaft having a relatively constricted portion, and a collar to be secured in place thereon, of a helical spring adapted to be compressed between the collar and the shoulder formed by the side of the constricted portion and an opening extending transversely through the shoulder and adapted to receive the spring.

2. In a device of the character described, the combination with a shaft, two enlargements thereon, and a collar to be secured in place between said enlargements, of a helical spring adapted to be interposed between one of the enlargements and the collar, there being a channel formed in one of the enlargements to permit the passage of the spring therethrough.

3. In a device of the character described, the combination with a shaft, a fixed support thereon, a second fixed support having a slot therethrough, and a collar to be secured in place between the two fixed supports, of a helical spring adapted to be passed through the slot and compressed between the collar and one of the fixed supports.

4. In a device of the character described, the combination with a shaft, a fixed support thereon, a second fixed support having an oblique slot therethrough, and a collar to be secured in place between the two fixed supports, of a helical spring adapted to be passed through the oblique slot and compressed between the collar and one of the fixed supports.

5. In a device of the character described, the combination with a shaft, a relative enlargement thereon, a second relative enlargement having an oblique slot extending therethrough, and a bearing-collar to be secured in place between the two enlargements, of a helical spring adapted to be passed through the slot in the enlargement and to be compressed between the slotted enlargement and the bearing-collar thus serving to hold the bearing-collar firmly against the other enlargement.

AUGUST RIEBE.

Witnesses:
WOLDEMAR HAUPT,
WILLIAM MAYNER.